Aug. 29, 1967  H. A. DUDLEY  3,338,630

SEAT COVER

Filed Oct. 22, 1965

INVENTOR
HAROLD A. DUDLEY

BY  *Kramer & Sturgeon*

ATTORNEYS

3,338,630
SEAT COVER
Harold A. Dudley, Fremont, Ohio, assignor to The S. E.
Hyman Company, a corporation of Ohio
Filed Oct. 22, 1965, Ser. No. 501,986
5 Claims. (Cl. 297—219)

ABSTRACT OF THE DISCLOSURE

A seat cover for automobile cushions comprising material for covering the cushions and a device for tensioning or tightening the cover on the cushions. The tensioning device includes tubular hems in the free marginal edges of the material which are bowed outwardly away from an opposing hem, and a continuous one-piece, stretchable drawstring in the hems, the drawstring having an overall length such that when the cover is placed on the cushion, the drawstring becomes tensioned and generally straightens the hems to tighten the cover on the cushion.

---

Seat cushions of different make automobiles vary as to size. Therefore, the seat cover must be made in such a manner as to be readily adaptable for covering different size cushions. One of the problems encountered, is fitting the seat cover material around various sized cushions such that the seat cover fits snugly on the cushions. This invention is directed to solving this particular problem.

Briefly stated, this invention is in a means for tightening the material of a seat cover, around or over a correspondingly formed cushion of an automobile. In accordance herewith, the seat cover is provided with pairs of oppositely disposed hems which are bowed outwardly or away from each other. A continuous stretchable draw string is provided in the hems. When the draw strings are stretched they tend to straighten or move the hems towards each other, which in turn stretches or tightens the seat cover material on the cushion. The basic concept of the invention may also be utilized in a one-piece seat cover for covering a seat cushion and adjoining back rest cushion.

The following description of the invention will be better understood by having reference to the annexed drawings wherein.

Figure 1:
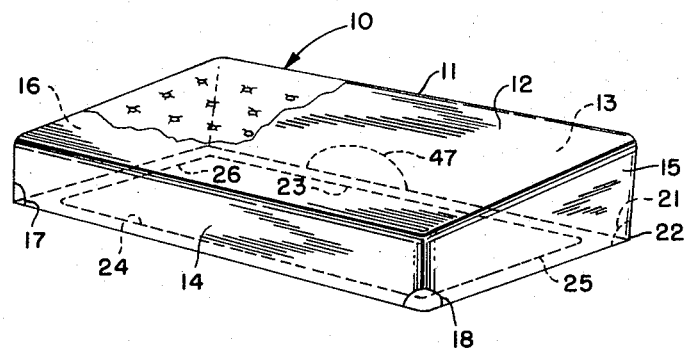
FIG. 1 is a perspective view of a front or rear seat cushion.
Figure 2:
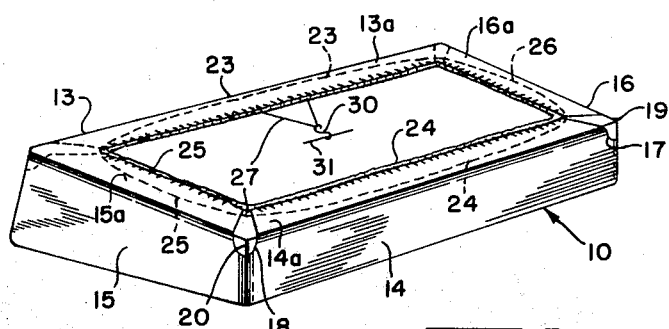
FIG. 2 is a perspective view of the same seat cushion overturned to illustrate the outwardly bowed hems of the cover.

Referring more particularly to FIGS. 1 and 2 of the annexed drawings, there is shown an automobile seat cushion, generally indicated at 10. A seat cover 11 of any suitable material, e.g., plastic or fabric, is provided for covering the seat cushion 10.

The seat cover 11 comprises a seat section or covering 12, oppositely disposed front and rear sections or coverings 13 and 14, respectively, and oppositely disposed side sections or coverings 15 and 16, respectively. The front, rear and side sections 13–16, respectively, are greater in width than the corresponding front, rear and sides of the seat cushion 10. The excess material from the front, rear and side sections 13–16, is tucked under the seat cover as illustrated in FIG. 2, and forms opposing front and rear, and side flaps 13a–16a, respectively.

The seat cover 11 may be provided with slots or openings 17 and 18 which fit around and expose the rear corresponding corners 19 and 20 of the seat cushion 10, and keep the seat cover material from wrinkling as it is stretched on the seat cushion. In some cases it may be desirable to provide similar slots at the front corners of the seat cover, e.g., slot or opening 21 exposing front corner 22.

Hems 23–26 are provided at the free marginal extremities of the opposing front and rear, and side sections 13–16 or front and rear and side flaps 13a–16a, respectively, of the seat cover 11. A continuous one-piece stretchable draw string 27 is provided in the hems 23–26. The hems 23–26 when the draw string 27 is unstretched, are bowed outwardly or away from each other (note dotted positions of hems 23–26 in FIG. 2). That is, oppositely disposed hems 23 and 24, and oppositely disposed hems 25 and 26 are bowed away from each other. When the cover 11 is placed on the seat cushion 10, the draw string 27 is stretched. As the draw string 27 is stretched, it tends to straighten the hems as illustrated in FIG. 2. The hems 23–26, as they straighten, naturally, stretch or tighten the material around the seat cushion 10 insuring a snug fit. Many of the seat covers presently employed do not use a continuous one-piece stretchable draw string. Also, they do not utilize the unique hem design of applicant's seat cover. Rather, they provide a plurality of fasteners, e.g. fastener 30, which are hooked on the stretchable draw string and fastened to framework 31 of the seat cushion 10 in spaced relation from the hem, e.g., hem 23, in order to stretch the draw string and pull or tighten the seat cover material snugly around the seat cushion 10.

Figure 3:
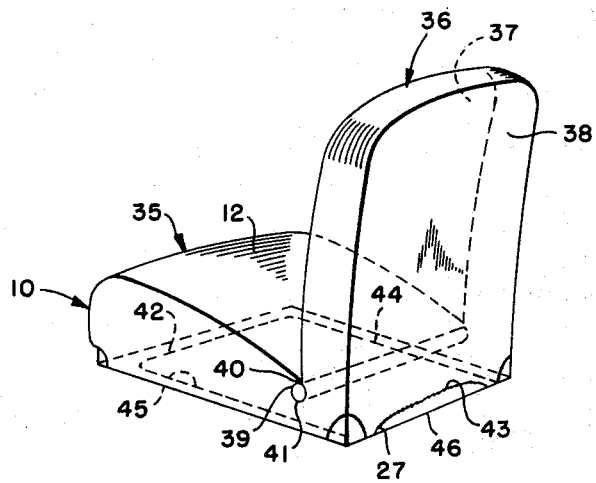
FIG. 3 is a perspective view of a seat cushion and back rest, illustrating a one-piece seat cover for covering the back rest and seat cushions.

Referring more particularly to FIG. 3, the basic idea of providing opposed hems which are bowed outwardly or away from each other, is used in conjunction with a one-piece seat cover, generally indicated at 35, for covering a back rest cushion 36 and the adjoining or adjacent seat cushion 10. The seat cover 35 is provided with similar seat cover sections, and in addition, back sections or coverings 37 and 38 which form an envelope for covering the back rest cushion 36.

Excess material in the form of a tuck-in flap 39 is provided between the seat section 12 and the adjacent back rest section 37. The excess material 39 is tucked into the crevice 40 between the seat cushion 10 and the back rest cushion 36. Slots or openings (not shown) may be provided in the tuck-in flap 39 to accommodate conventionally designed seat belts.

A cardboard roller or tube 41 is inserted in the crevice 40 within the tuck-in flap 39. In this manner the seat portion 12 and back portion 37 are stretched or tightened on the corresponding seat and back supporting sections of the seat cushion 10 and back cushion 36, respectively.

The seat cover 35 is similarly provided with hems 42–45 which are similarly bowed outwardly or away from each other so that when the continuous draw string 27 is stretched, the hems will tend to straighten, thus tightening the seat cover material on the seat cushion 10 and back rest cushion 36. The hem 43 at the free marginal edge of the back rest section 38 is, preferably, exposed, being disposed adjacent the bottom marginal edge 46 of the back cushion 36. The rear hem 43 may, however, be tucked under the seat cushion 10 in a manner similar to hem 24. (FIG. 2), and the other hems 42, 44 and 45. The location of the hem 43, in either case, does not detract from the spirit of the invention, but does effect the ease of installing the seat cover 35, the hem 43 exposed, adjacent the back cushion edge 46 naturally allowing the seat cover 35 to be more readily installed.

The seat covers 11 and 35 may be provided with a cut out portion 47 (FIG. 1) when the seat cushion 10 is correspondingly designed to fit around a raised hump in the floor caused, for example, by the drive shaft of an automobile engine.

Thus, there has been provided a new and novel seat cover having pairs of opposed hems which are bowed outwardly or away from each other. Also provided is a continuous one-piece stretchable draw string in the hem which when stretched tends to straighten the hems thereby tightening the material on the seat cushion.

Other modes of applying the principle of this invention may be employed instead of those specifically set forth above, changes being made as regards the details herein disclosed, provided the elements set forth in any of the following claims, or the equivalent of such, be employed.

It is, therefore particularly pointed out and distinctly claimed as the invention:

1. In combination:
    (a) a seat cushion;
    (b) a seat cover for the cushion, said cover including:
        (1) top, front, rear, and side sections covering corresponding top, front, rear, and sides of the cushion;
        (2) flaps secured to, and extending from said front, rear, and side sections, said flaps partially covering the bottom of the cushion and having free marginal edges;
        (3) portions of the flaps and said front, rear, and side sections cut away to expose the corners of the cushion adjacent the bottom of the cushion;
        (4) tubular hems disposed in the free marginal edges of said flaps, each hem being bowed outwardly away from an opposing hem when the cover is untensioned and apart from the cushion; and
        (5) a continuous, one-pece, stretchable drawstring disposed in the hems and having an overall length such that when the cover is on the cushion, the drawstring becomes tensioned and generally straightens the hems to tighten the cover on the cushion.

2. In combination:
    (a) a seat cushion;
    (b) a backrest cushion, angularly disposed to said seat cushion;
    (c) a single, one-piece seat cover for said seat and backrest cushions, said cover including:
        (1) top, front and side sections covering corresponding top, front, and two sides of the seat cushion;
        (2) flaps secured to and extending from said front and side sections for partially covering corresponding bottom portions of the seat cushion, said flaps having free marginal edges;
        (3) an envelope covering front, back, side and top portions of the backrest cushion, said envelope having a free marginal edge adjacent the back portion of the backrest cushion;
        (4) a tuck-in portion interposed between the top section covering the seat cushion, and that part of the envelope covering the front portion of the backrest cushion, said tuck-in portion being insertable in a crevice formed between the seat and backrest cushions;
        (5) portions of the flaps, said front and side sections, and said envelope cut away to expose the front corners of the seat cushion and the back corners of the backrest cushion adjacent the bottom of the seat and backrest cushions, respectively;
        (6) tubular hems disposed at the free marginal edges of said flaps and envelope, each hem being bowed outwardly away from an opposing hem when the cover is untensioned and apart from the cushions; and
        (7) a continuous, one-piece, stretchable drawstring disposed in the tubular hems and having an overall length such that when the cover is placed over the cushions, the drawstring becomes tensioned and generally straightens the hems to tighten the cover on the cushion.

3. The combination of claim 2, wherein the seat cover includes:
    (8) means for tensioning the tuck-in portion to tighten the top section on the seat cushion and the envelope on the backrest cushion.

4. The combination of claim 3 wherein the hem in the free marginal edge of the envelope is at least partially exposed along the back portion of the backrest cushion.

5. The combination of claim 3 wherein the tensioning means (8) includes a tube insertable in the tuck-in portion.

References Cited
UNITED STATES PATENTS

| | | | |
|---|---|---|---|
| 517,306 | 3/1894 | Seher | 5—354 |
| 1,530,088 | 3/1925 | Nathan | 297—229 |
| 1,820,104 | 8/1931 | Whaley | 297—224 |
| 1,861,455 | 6/1932 | Schwartz | 297—229 |
| 1,871,003 | 8/1932 | Longletz et al. | 5—334 |
| 2,129,225 | 9/1938 | Mednick | 297—225 |
| 2,143,314 | 1/1939 | Habel | 227—229 |
| 2,212,485 | 8/1940 | Krasnov | 297—224 |
| 2,350,359 | 6/1944 | Krasnov et al. | 297—224 |
| 2,822,862 | 2/1958 | Zacks | 297—229 |
| 2,942,280 | 6/1960 | May | 5—334 |
| 3,066,323 | 12/1962 | Kintner | 5—344 |

FRANCIS K. ZUGEL, *Primary Examiner.*